(12) United States Patent
Eerola

(10) Patent No.: US 7,852,907 B2
(45) Date of Patent: Dec. 14, 2010

(54) PERFORMING A CORRELATION IN RECEPTION OF A SPREAD SPECTRUM SIGNAL

(75) Inventor: Ville Eerola, Hameenlinna (FI)

(73) Assignee: Nokia Corporation, Espoo (FI)

( * ) Notice: Subject to any disclaimer, the term of this patent is extended or adjusted under 35 U.S.C. 154(b) by 925 days.

(21) Appl. No.: 11/645,360

(22) Filed: Dec. 21, 2006

(65) Prior Publication Data

US 2007/0153882 A1    Jul. 5, 2007

(30) Foreign Application Priority Data

Dec. 23, 2005    (WO)    ................ PCT/FI2005/050485

(51) Int. Cl.
*H04B 1/00* (2006.01)
*H04B 1/06* (2006.01)
*G01C 21/00* (2006.01)

(52) U.S. Cl. ................ 375/150; 375/148; 455/272; 701/213

(58) Field of Classification Search ................ 375/148, 375/150; 455/272
See application file for complete search history.

(56) References Cited

U.S. PATENT DOCUMENTS

| | | | | |
|---|---|---|---|---|
| 5,897,605 | A * | 4/1999 | Kohli et al. | ................ 701/213 |
| 6,041,280 | A * | 3/2000 | Kohli et al. | ................ 701/201 |
| 6,047,017 | A * | 4/2000 | Cahn et al. | ................ 375/148 |
| 6,125,325 | A * | 9/2000 | Kohli | ................ 701/213 |
| 6,198,765 | B1 * | 3/2001 | Cahn et al. | ................ 375/142 |
| 7,039,134 | B1 * | 5/2006 | Avital et al. | ................ 375/343 |
| 2001/0002458 | A1 * | 5/2001 | Kohli | ................ 701/213 |
| 2002/0072343 | A1 * | 6/2002 | Miyatani | ................ 455/272 |
| 2003/0011513 | A1 * | 1/2003 | Zhao et al. | ............. 342/357.09 |
| 2003/0081660 | A1 | 5/2003 | King et al. | |
| 2003/0081669 | A1 * | 5/2003 | Yousef et al. | ................ 375/233 |
| 2005/0080561 | A1 * | 4/2005 | Abraham et al. | ............ 701/213 |
| 2007/0153882 | A1 * | 7/2007 | Eerola | ................ 375/150 |

FOREIGN PATENT DOCUMENTS

| | | |
|---|---|---|
| EP | 1441449 | 7/2004 |
| WO | WO 0069086 | 11/2000 |
| WO | WO 2005104392 | 11/2005 |

* cited by examiner

*Primary Examiner*—Mohammad H Ghayour
*Assistant Examiner*—Sarah Hassan
(74) *Attorney, Agent, or Firm*—Alfred A. Freesola; Ware, Freesola, Van Der Sluys & Adolphson, LLP

(57) ABSTRACT

A correlator (30) for performing a correlation with a received spread spectrum signal, comprising at least an input (30.1) for inputting samples of a received signal; at least one reference code input (30.2) for inputting at least one reference code, a correlator block comprising a data shift register (36) for receiving the signal samples; a number of register groups (31) comprising a code shift register (33) for receiving at least a part of at least one reference code; and a code register (34) for receiving data from the code shift register (33); configuration pathways (201, 202, 203) for arranging the connections between the code shift register and code register (33, 34) of the register groups (31) in a reconfigurable manner.

16 Claims, 10 Drawing Sheets

PERFORMING A CORRELATION IN RECEPTION OF A SPREAD SPECTRUM SIGNAL

CROSS REFERENCE TO RELATED APPLICATIONS

This application claims priority under 35 USC §119(a) to International Patent Application No. PCT/FI2005/050485 filed on Dec. 23, 2005.

FIELD OF THE INVENTION

The present invention relates to a correlator for performing a correlation with a received spread spectrum signal, comprising at least an input for inputting samples of a received signal; a code generator block for generating at least one reference code; a mixer block for mixing correlated signals; and an integrator block for integrating the mixed signals. The present invention relates to a receiver for receiving a spread spectrum signal, comprising at least sampling means for forming samples of a received signal; a correlator for performing a correlation with the samples of the received spread spectrum signal; a code generator block for generating at least one reference code; a mixer block for mixing correlated signals; and an integrator block for integrating the mixed signals. The invention also relates to an electronic device comprising a receiver for receiving a spread spectrum modulated signal, comprising at least sampling means for forming samples of a received signal, a correlator for performing a correlation with the samples of the received spread spectrum signal; a code generator block for generating at least one reference code; a mixer block for mixing correlated signals; and an integrator block for integrating the mixed signals. The invention also relates to a system comprising a transmitting station for transmitting a spread spectrum modulated signal, a receiver for receiving a spread spectrum modulated signal, the receiver comprising at least sampling means for forming samples of a received signal; a correlator for performing a correlation with the samples of the received spread spectrum signal; a code generator block for generating at least one reference code; a mixer block for mixing correlated signals; and an integrator block for integrating the mixed signals. Furthermore, the invention relates to a module for performing a correlation with a received spread spectrum signal, comprising at least an input for inputting samples of a received signal; a code generator block for generating at least one reference code; a mixer block for mixing correlated signals; and an integrator block for integrating the mixed signals. The invention also relates to a method for performing a correlation with a received spread spectrum signal in a correlator, the method comprising at least inputting samples of a received signal; generating at least one reference code; mixing correlated signals; and integrating the mixed signals. Moreover, the invention relates to a computer software product which comprises instructions for inputting samples of a received signal; generating at least one reference code; mixing correlated signals; and integrating the mixed signals.

BACKGROUND OF THE INVENTION

Spread spectrum modulated signals (CDMA, Code Division Multiple Access) are used, for example, in global navigation satellite systems (GNSS), such as the GPS (global positioning system) system, as well as in many third generation mobile communication systems, such as the UMTS (universal mobile telecommunication system). For generating a spread spectrum modulated signal, the modulation is performed in a transmitter by using an individual spreading code, wherein several transmitters can simultaneously transmit a signal at the same frequency, when each transmitter is allocated a unique spreading code. For example, in satellite positioning systems, each satellite uses a spreading code of its own. In the receiver, the corresponding reference code is generated or it is read from the memory of the receiver, and this reference code is used for searching the received signal for the signal of the transmitter which is to be received. For successful signal reception, the receiver must perform acquisition of the signal, typically by using several correlators and controlling the code phase and frequency of the reference code, wherein the signals generated by the correlators are used to determine the correct code phase and the frequency shift. After the acquisition has been completed, the tracking of the signal is continued so that the reception of the signal and the demodulation of the information transmitted therein would be possible. In this tracking step, the code phase and frequency of the reference code are to be kept locked with the code phase and frequency of the signal to be received.

In the acquisition phase it is desirable to cover as large a search range as possible, while in tracking phase the coverage is generally not an issue, but tracking accuracy requirements will usually need better timing resolution than what is required for the acquisition phase. This is usually achieved by changing the sampling frequency of the incoming signal. For acquisition phase, lower sampling frequency allows more time coverage in a given number of samples. For tracking phase, higher sampling frequency results in increased time resolution for improved tracking accuracy.

The acquisition and the tracking of the signal are problematic particularly indoors where the strength of the signal to be received is poor, possibly even lower than background noise. Such a situation occurs particularly in satellite positioning systems, in which the signal to be received is very weak upon arrival on the earth, and indoors this signal can further be attenuated by the walls of buildings. To cure this problem, solutions of prior art are aimed at implementing the receiver by providing it with a large number of correlators and by using a long integration time. At present, receivers may comprise as many as about 16,000 correlators. For the sake of comparison, it should be mentioned that the first portable GPS receivers only comprised 12 or even fewer correlators. The increase in the number of correlators naturally also means that the circuit board area required for implementing the correlators is significantly increased as well. Furthermore, this increases the power consumption of the receiver. Because of the higher power consumption, the heating of the device may also be increased.

Group Correlator is a code correlation device, which is optimized for reception of multiple signals at the same time. It utilizes time multiplexing to share some of the signal processing hardware amongst several different processing channels. The original group correlator structure is intended to be used at a single sampling rate at a time. Thus one group correlator would be needed for acquisition phase processing and one for tracking phase processing.

A GNSS receiver needs to perform both the acquisition and tracking operations for full functionality. Additionally, in normal operation some of the received signals are being searched for while other signals are being tracked. It would be desirable to be able to handle both cases with minimal hardware and control complexity.

Furthermore multiple GNSS systems and operating modes bring the need to use many sampling frequencies in a GNSS receiver designed to acquire and track signals from more than one GNSS system. Hardware should be minimized while allowing maximal flexibility of resource usage for the software. Different operating modes for the correlation should have minimal effect to the rest of the hardware to simplify hardware design. Group correlator architecture is desirable due to its versatility in both search and tracking mode operation, but it cannot cover multiple input sample rates in the traditional form.

In order to perform both signal acquisition and tracking, a GNSS receiver would need to do one of the following. One alternative is to use one group correlator for the acquisition and one group correlator for the tracking. However, this would increase the hardware size. Another alternative is to operate one group correlator using two different clock frequencies. This has the drawback that the control of the receiver is very complicated since all the processing after the group correlator would need to be adjusted accordingly. A third alternative is to use two group correlators, but time-multiplexing the subsequent processing i.e. the stages after the group correlator perform acquisition and tracking related operations in a multiplexed manner. This approach increases the size and makes the control of the subsequent processing very difficult as streams of samples with different sample rates would need to be processed with just one hardware block.

In many prior art GNSS receivers a correlator hardware which only comprises a few code delays per channel has been used to acquire and track the signal. This kind of receiver operates too slowly for current demands, since the correlators have very limited search ranges. Therefore, some approaches have been developed in which separate acquisition accelerator hardware is used for acquisition phase and the tracking phase is implemented by traditional correlator hardware.

Some solutions are also known which use correlator structures that can be configured as acquisition accelerators in one mode and as tracking correlators in one mode. However, they are not able to perform acquisition and tracking at the same time.

As examples of GNSS systems we mention here the GPS (Global Positioning System) and Galileo. The GPS is already operating globally while the Galileo system is under construction when this patent application is filed. However, the operating parameters for the Galileo system have already been defined, but it should be noted that the parameters may change. The operating parameters of both the GPS and Galileo are shown in Table 1 from which it can be seen that there are some similarities between them. It can also be seen from Table 1 that the acquisition to both GPS and Galileo system signals might not be equally efficient if the same correlation length were used.

TABLE 1

|  | GPS | Galileo |
| --- | --- | --- |
| Chip rate (MHz) | 1.023 | 1.023 |
| PRN code length in chips | 1023 | 4092 |
| BOC code factor (samples per chip) | 1 | 2 |
| Total code search range in equiv. chips | 1023 | 8184 |
| Oversampling ratio (samples per chip) | 2 | 2 |
| Minimum sampling rate (MHz) | 2.046 | 4.092 |
| Total code search range in samples | 2046 | 16368 |

The PRN (Pseudo Random Number) code parameters determine the requirements for the correlation part of the GNSS receiver. The chip rate, BOC (Binary Offset Carrier) factor and oversampling ratio determine the needed sampling rate. The code length, BOC factor and oversampling ratio determine the number of samples needed to cover full code uncertainty.

SUMMARY OF THE INVENTION

The present invention relates to a correlator, which can operate in different modes for acquisition and tracking phase while maintaining the output sample clock frequency. This reduces the control complexity and keeps the hardware size small.

The fundamental feature of the reconfigurable group correlator according to the present invention is that one hardware block can be configured to different modes. The correlation length changes in different modes, but the number of total correlation bins stays the same. This leads to maintaining output sample rate while input sample rate changes. Also the number of correlations performed changes. The processing hardware after correlation does not need to adapt to different modes, since the output comes substantially at the same rate.

In addition to changing the input sample rate it is also possible to implement different chaining options, where the incoming reference code can be chained, which allows larger code coverage controlled by one replica code generator.

According to the present invention, a method has been invented for correlating a spread spectrum modulated signal in a group correlator by configuring the connections between different registers of the group correlator according to the operation mode in question, wherein it is possible to utilize the correlators more efficiently. To put it more precisely, the correlator according to the present invention is primarily characterized in that said correlator also comprises:
  a group correlation core comprising
    a number of register groups comprising
      a code shift register for receiving at least a part of at least one reference code; and
      a code register for receiving data from the code shift register;
    configuration pathways for arranging the connections between the code shift register and the code register of the register groups in a reconfigurable manner.

The receiver according to the present invention is primarily characterized in that said correlator of the receiver comprises:
  a group correlation core comprising
    a number of register groups comprising
      a code shift register for receiving at least a part of at least one reference code; and
      a code register for receiving data from the code shift register;
    configuration pathways for arranging the connections between the code shift register and the code register of the register groups in a reconfigurable manner.

The electronic device according to the invention is primarily characterized in that said correlator of the electronic device comprises:
  a group correlation core comprising
    a number of register groups comprising
      a code shift register for receiving at least a part of at least one reference code; and
      a code register for receiving data from the code shift register;
    configuration pathways for arranging the connections between the code shift register and the code register of the register groups in a reconfigurable manner.

The system according to the invention is primarily characterized in that said correlator of the receiver comprises:
  a group correlation core comprising a number of register groups comprising
a code shift register for receiving at least a part of at least one reference code; and
a code register for receiving data from the code shift register;
configuration pathways for arranging the connections between the code shift register and the code register of the register groups in a reconfigurable manner.

The module according to the invention is primarily characterized in that said correlator also comprises:
a group correlation core comprising
a number of register groups comprising
a code shift register for receiving at least a part of at least one reference code; and
a code register for receiving data from the code shift register;
configuration pathways for arranging the connections between the code shift register and the code register of the register groups in a reconfigurable manner.

The method according to the invention is primarily characterized in that the method also comprises:
configuring a group correlation core of said correlator
for receiving at least a part of at least one reference code to a code shift register;
for receiving data from the code shift register to a code register; and
for arranging the connections between the code shift register and the code register of the register groups.

Finally, the computer software product according to the invention is primarily characterized in that the computer software product also comprises instructions for:
configuring a group correlation core of said correlator
for receiving at least a part of at least one reference code to a code shift register;
for receiving data from the code shift register to a code register; and
for arranging the connections between the code shift register and the code register of the register groups.

For example, the following advantages are achieved by the present invention: The main advantage is minimal HW complexity compared to traditional approaches, and possibility for the software to configure the hardware mode.

For the hardware implementation, single building block can be used to implement all correlators, which may simplify hardware design, ease hardware configurability, improve hardware flexibility and usability, and reduce hardware resources needed.

The circuit board area of the receiver according to the present invention is saved when compared with arrangements of prior art, because the same multiplication operations, code shifts and additions can be used in several different codes and code phases. Furthermore, the bandwidth of the signal after the correlator is relatively wide, typically covering the whole Doppler frequency range to be searched, when the receiver is applied in connection with satellite positioning systems. Thus, a division of the frequency range to be searched in smaller subbands and a search in the subbands will not be necessary. Furthermore, the number of ports and the circuit board area can be reduced by using time multiplexing, wherein some blocks of the receiver can be used for the acquisition of different signals. Such time multiplexing is possible in the receiver according to the invention, for example, for the reason that the processing rate required after the group correlator is relatively low. The correlator according to the invention can also be divided into various parts.

Furthermore, the invention makes it possible to use the same blocks for both the acquisition and the tracking.

DESCRIPTION OF THE DRAWINGS

In the following, the invention will be described in more detail with reference to the appended drawings, in which.

DETAILED DESCRIPTION OF THE INVENTION

Figure 1:
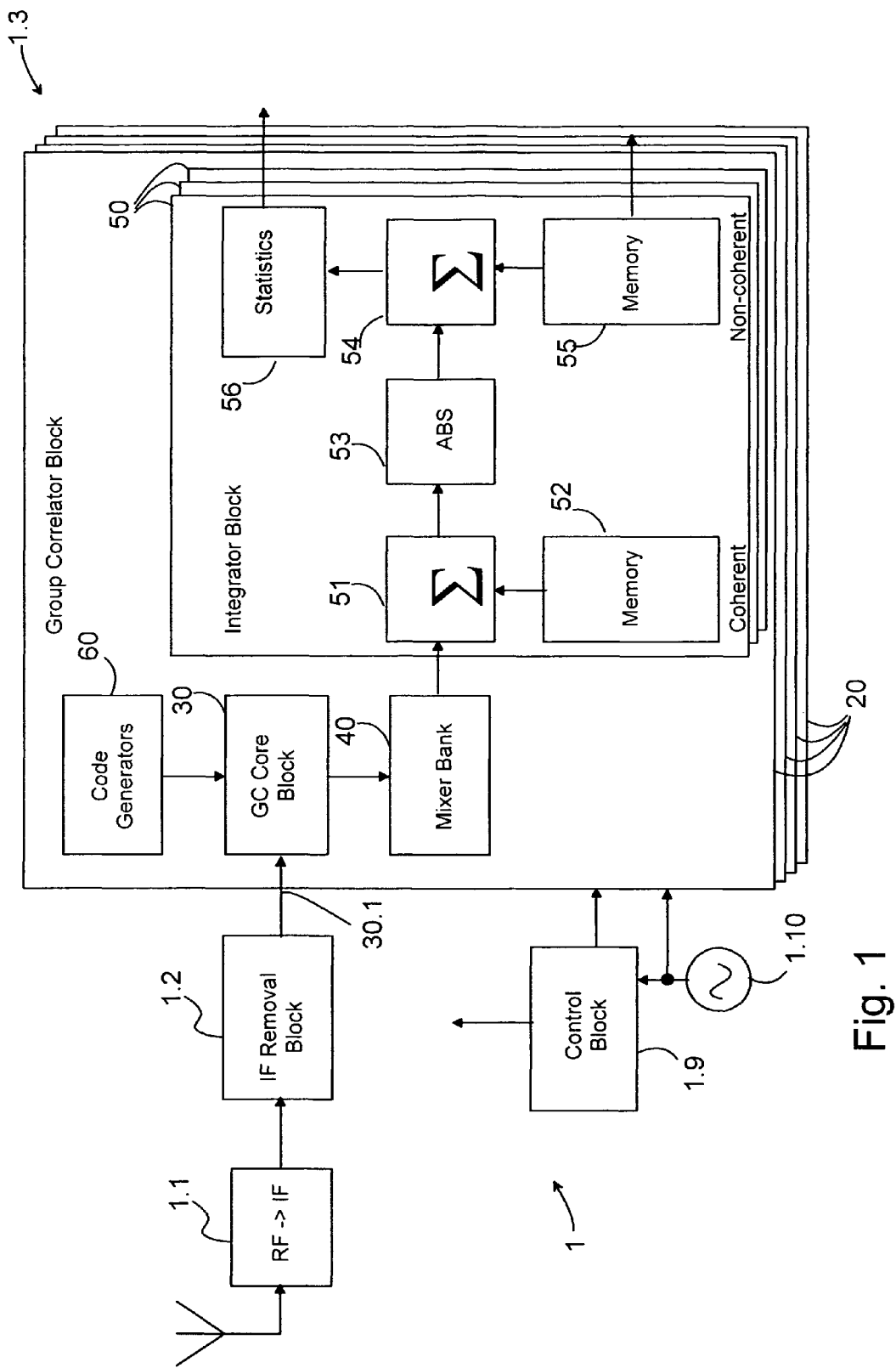
FIG. 1 shows in a reduced block diagram an example of a receiver in which the present invention can be applied.

An example of a receiver 1 in which the correlator 1.3 according to the present invention can be applied, is illustrated in FIG. 1. The receiver 1 is a receiver of a satellite positioning system receiving spread spectrum modulated signals from satellite stations. However, it will be obvious that the invention can also be applied in other systems using spread spectrum modulated signals. The receiver 1 comprises a receiving stage 1.1 for taking the necessary steps for the processing of signals in a given frequency band, such as bandpass filtering, amplification, conversion to an intermediate frequency, and sampling. After this, the samples are input in an intermediate frequency removal block 1.2 and further in the correlator 1.3. In the correlator 1.3 the signals are processed as will be described later in this application.

Figure 2:
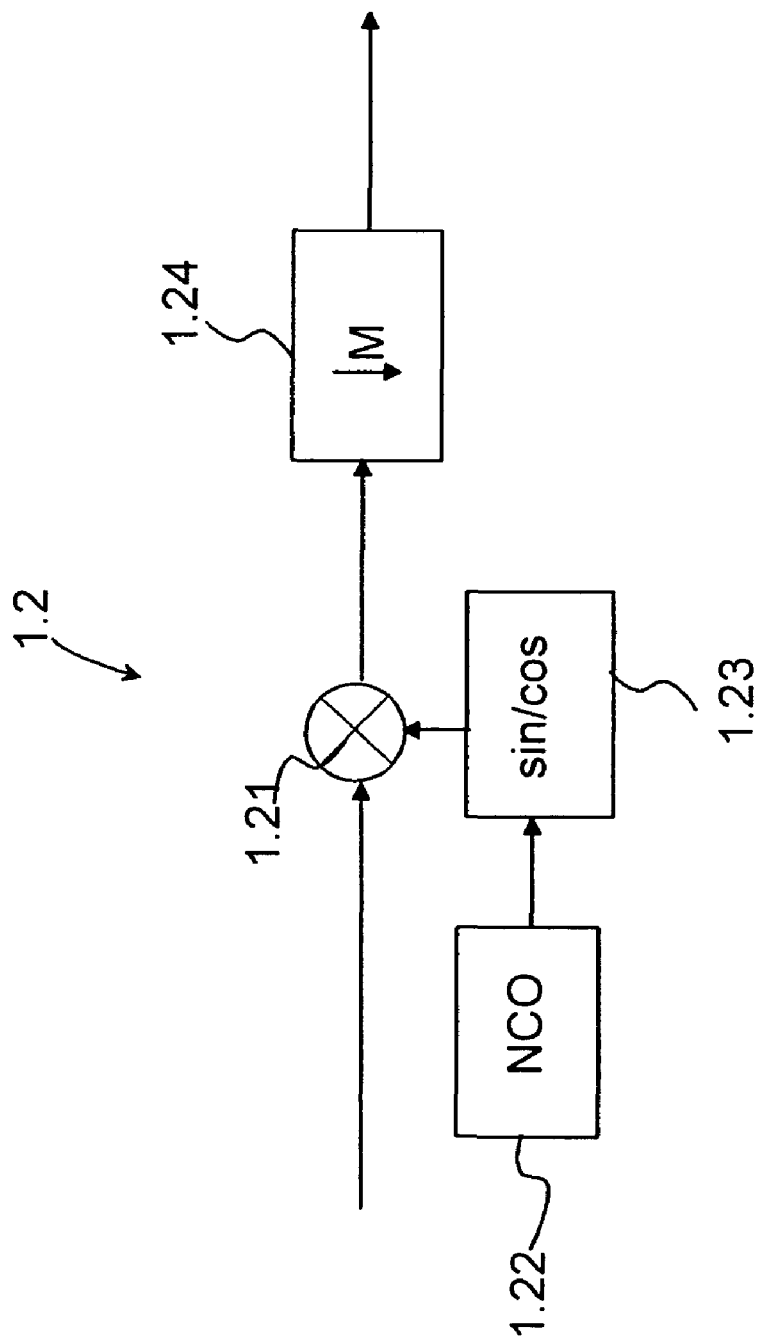
FIG. 2 shows an example of an intermediate frequency removal block which can be used in the receiver of the present invention.

FIG. 2 shows one intermediate frequency removal block 1.2 which can be used in the receiver 1 according to the invention. The samples input in the intermediate frequency removal block 1.2 are mixed in a mixer 1.21 with a signal generated by a numerically controlled oscillator 1.22, of which signal two signals of different phases are first formed in a phase shift block 1.23. The phase shift between these signals is about 90 degrees, and the aim in the mixer 1.21 is to clear the received signal of a possible intermediate frequency (IF) as well as of the satellite Doppler frequency, wherein the output of the mixer 1.21 is a baseband signal. This baseband signal is then sampled in a decimation block 1.24 whose sampling frequency is different from the sampling frequency used at the sampling in the receiving stage 1.1. The samples taken in the decimation block 1.24 are input in the group correlation core block(s) 20.

The receiver 1 which comprises the correlator 1.3 of the present invention can simultaneously receive signals from transmitters of different systems. The correlator 1.3 comprises one or more group correlator blocks 20 each of which comprise one group correlator core block 30. One group correlator block 20 can be set, for example, to acquire signals of one or more GPS satellites while another group correlator block 20 can be set to acquire signals of another GNSS satellite. It is also possible that one group correlator block 20 is set to acquire signals and another group correlator block 20 is set to track signals to which the group correlator block 20 has previously performed the acquisition.

When the receiver 1 according to the invention is applied, for example, in satellite positioning systems, only one intermediate frequency removal block 1.2 is needed before the correlator 1.3, because the bandwidth after the group correlator block(s) 30 covers the whole Doppler frequency range searched for satellite signals (frequency shift caused by Doppler shift).

The blocks of the receiver 1 are controlled e.g. by a digital signal processor 1.9 or a corresponding controller. In the acquisition function, fixed values (frequency and phase) for a given search are set in the frequency bin generator block 41 of the mixer block 40. In the tracking function, the frequency bin generator block 41 of the mixer block 40 are controlled to keep the receiver 1 locked with the signal to be received. This is achieved by controlling the frequency and the phase, if necessary. In the tracking function, the digital signal processor 1.9 can read the results of the coherent integration from the memory area used by the coherent integration block 51, when the signal to be received is sufficiently strong. During the reception of a weak signal, the acquisition and tracking functions may further include non-coherent integration in the non-coherent integration block 53. In this situation, the digital signal processor 1.9 reads the results of the non-coherent integration from the memory area used by the non-coherent integration block 53 and uses these values to control the acquisition/tracking.

It is apparent that even though the control block 1.9 is presented as a separate block in the above description of the invention and in the appended drawings, some of the blocks of the receiver 1 can be implemented, for example, as functions of a digital signal processor used as the control block 1.9, or as functions of a digital signal processor separate from the control block 1.9.

Figure 5:
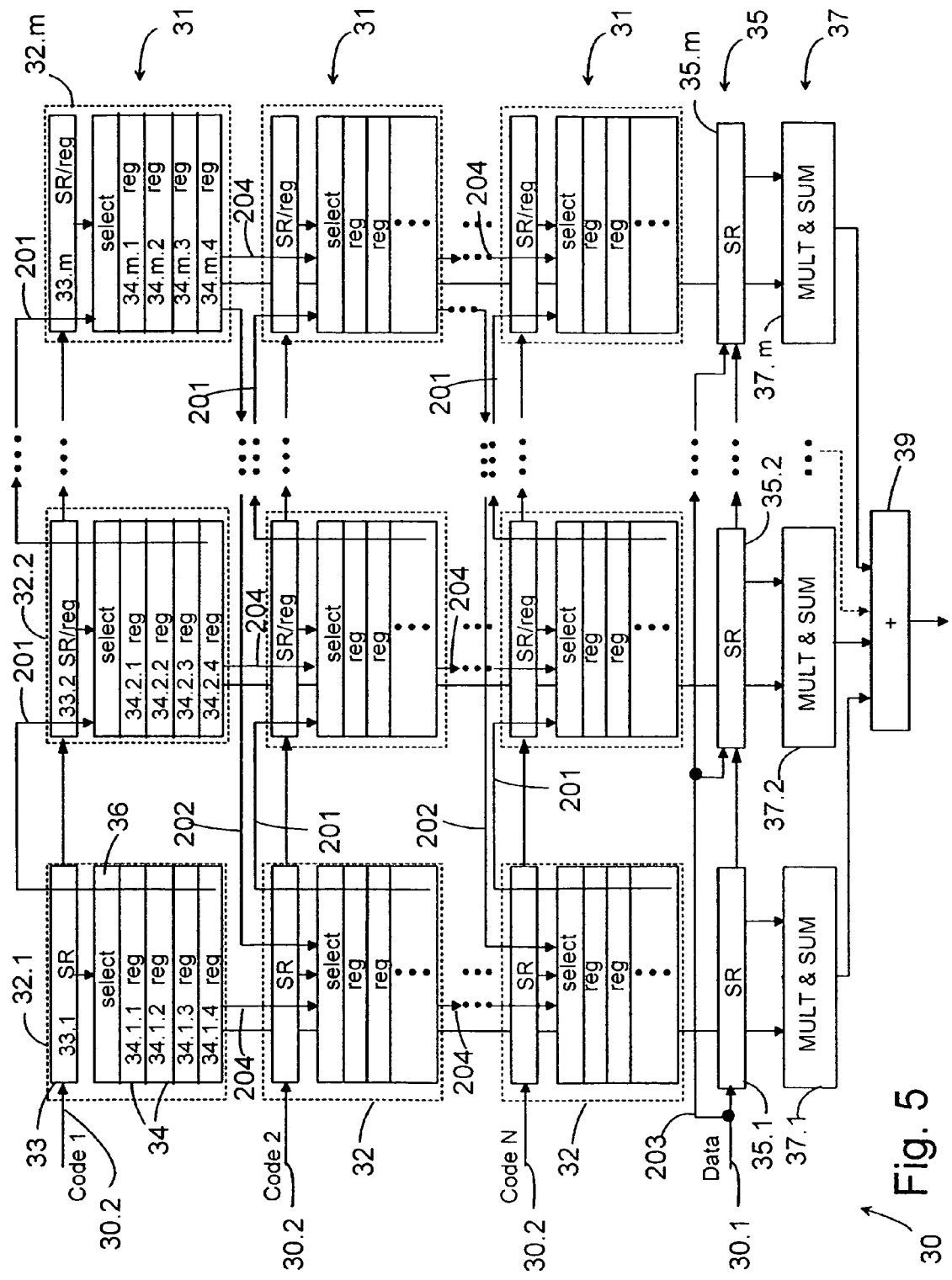
FIG. 5 shows a logical view of an example embodiment of the group correlator core block according to the present invention in a reduced block diagram.

The basic block diagram of an example embodiment of the group correlator core block 30 of the present invention is illustrated in FIG. 5, where different arrows 201, 202, 203 show the possible data flows (pathways). Enabling or disabling the data flows shown by the arrows 201, 202, 203 can change the operational mode of the group correlator. The data flows between different blocks of the group correlator core block 30 can be controlled, for example, with multiplexers, switches, FETs, etc., or by software when the group correlator is implemented e.g. with a digital signal processor (DSP). In FIG. 5 details of controlling the data flow are not shown.

The group correlator core block 30 comprises N register groups 31. In an example embodiment the number N corresponds to the number of receiving blocks, or the number of satellites to be searched at a time by one group correlator block 20; for example, there are four register groups 31 when the group correlator block 20 receives four satellites. In another example embodiment the number N corresponds to one-half of the number of receiving blocks (i.e. if there are eight receiving blocks, the number N equals to four). For the sake of clarity, however, only three register groups 31 are shown in FIG. 5, one for each code 1 . . . N. The number of subgroups is marked as M in this application. Therefore, it can be defined that both N and M are positive integers greater than 1. Each register group 31 comprises one or more subgroups 32 which comprise a code shift register 33 and one or more code registers 34. The length (storage positions) of the code shift registers 33 and the code registers 34 is the same in each subgroup. The data flows between the blocks of each subgroup (i.e. the code shift register 33 and the code registers 34), between subgroups 32 of the same register group 31, and between different register groups 31 can be varied in certain ways to allow the re-configurability of the group correlator of the present invention.

In the following, the code shift register 33.1 of the first subgroup 32.1 is also called as the first code shift register, the code shift register 33.2 of the second subgroup 32.2 is also called as the second code shift register, and the code shift register 33.m of the Mth subgroup 32.m is also called as the Mth code shift register.

The group correlator core block 30 also comprises a sample shift register group 35 in which the samples are input via e.g. the input line 30.1. In an example embodiment of the present invention the sample shift register group 35 comprises as many sample shift registers 35.1, . . . , 35.m as there are subgroups 32 in the register groups 31. The sample shift registers 35.1, . . . , 35.m are chipped at the same rate as samples are input in the group correlator core block 30. In other words, samples are shifted at the same rate as samples are input in the group correlator core block 30.

There is also a combiner group 37 and an output block 38 in the correlator core block 30 of the present invention. The combiner group 37 includes a number of multiply and combine blocks 37.1, . . . 37.m for performing a multiplication operation and a combining operation. The number of the multiply and combine blocks 37 in the combiner group 37 equals to the number of subgroups 32 in this example. The output block 38 sums the outputs of the multiply and combine blocks 37.

Figure 3:
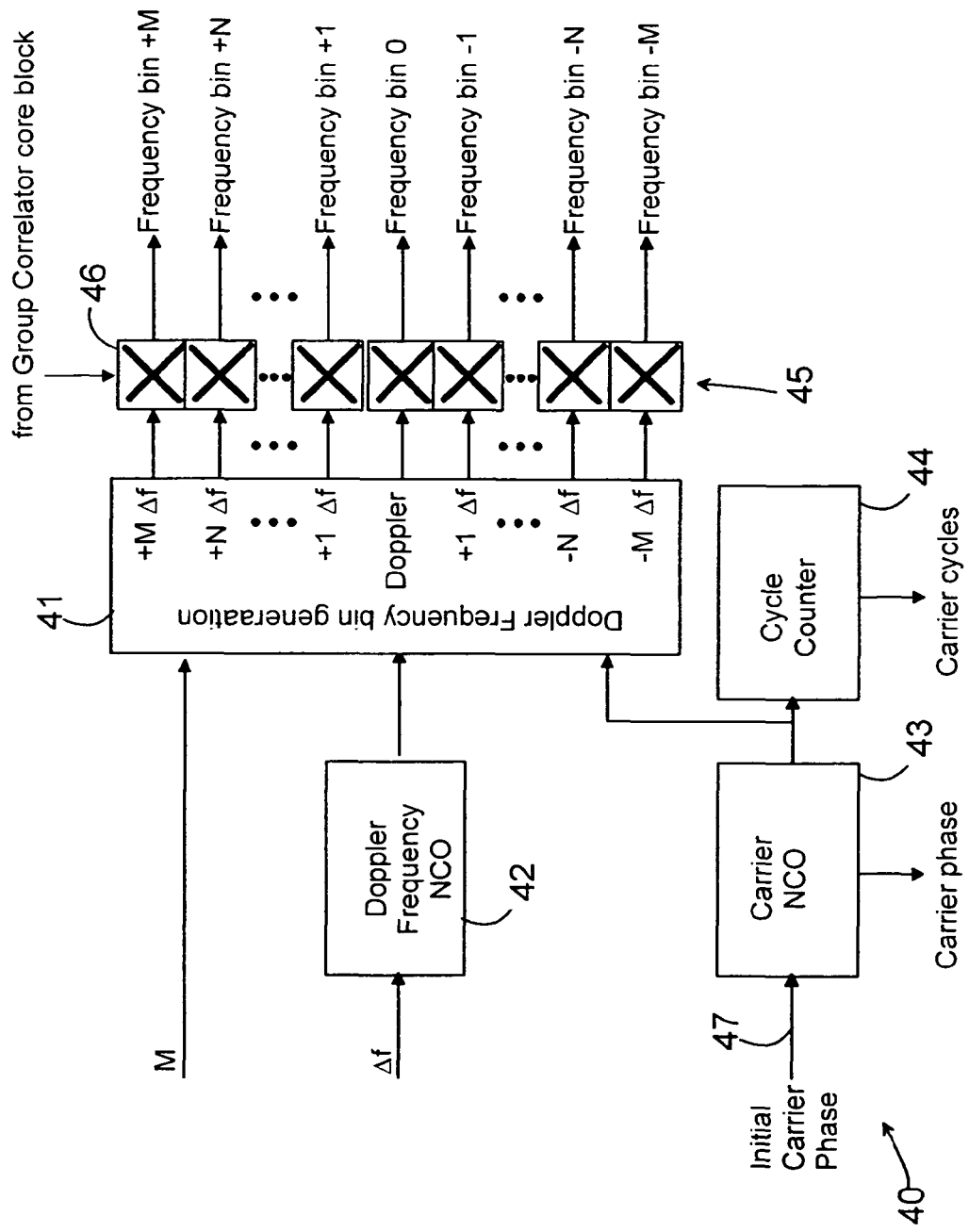
FIG. 3 shows a logical view of an example embodiment of a mixer block of the group correlator according to the present invention.

The signals formed in the group correlator core block 30 can then be input in the mixer block 40, of which one example is shown in FIG. 3. In this embodiment, the mixer block 40 comprises one frequency bin generator block 41 for generating different Doppler frequency bins. The frequency bin generator block 41 gets a signal for a DFT oscillator 42 (DFT NCO), which is controlled by inputting a desired frequency spacing ($\Delta f$) between adjacent frequency bins. Further, the frequency bin generator block 41 receives another input (M) for setting the outmost frequency bin. The minimum number of frequency bins is five (center frequency, $+1\Delta f$, $-1\Delta f$, $+2\Delta f$, $-2\Delta f$), in which case M=2. The carrier oscillator 43 sets the centre frequency (Doppler) for the frequency bin generator block 41. The initial phase of the carrier oscillator 43 can be set by an Initial Carrier Phase signal 47 which is input to the carrier oscillator 43. Hence, the frequency bin generator block 41 generates a frequency bin at the Doppler frequency and at certain frequency offsets from the Doppler frequency. The frequency offsets are, for example, at an integer multiples of the frequency spacing around the Doppler frequency, i.e. $+1\Delta f$, $-1\Delta f$, $+2\Delta f$, $-2\Delta f$, . . . $+M\Delta f$, $-M\Delta f$. The example embodiment of the frequency bin generator block 41 also comprises a cycle counter 44 for counting carrier cycles.

Each output of the frequency bin generator block 41 is connected to one mixer 46 of the mixer group 45. The signals from the outputs of the group correlator core block 30 are connected to the other inputs of the mixers 46 of the mixer group 45. Therefore, each mixer 46 of the mixer group 45 forms a mixing result of the output signal of the group correlator core block 30 and the signal of one of the frequency bins. These mixing results are coherently integrated at the coherent integrator block 51.

There is one integrator block 50 for each frequency bin in the group correlator 30 according to the present invention. Each coherent integrator block 50 comprises an integrator 51 for integrating the signal coming from one mixer 46 of the mixer group 45. There is also a first memory 52 for temporarily storing data to be coherently integrated and intermediate results of the coherent integration. It should be noted here that the signals in the above described stages are in two-component form, i.e. they comprise an in phase component (I) and a quadrature phase component (Q). In the transform block 53 the two-component signals are transformed into one-component signals, for example by squaring the components and taking a square root of the sum of the squared values ($\sqrt{I^2+Q^2}$) which is known as such. Also other ways to make the transformation are possible. The signals resulting from the transformation are non-coherently integrated at the non-coherent integration block 54. There is also a second memory 55 for storing non-coherent integration results and intermediate results of the non-coherent integration. The non-coherent integrator block 54 can also comprise a statistics block 56 for determining e.g. the maximum value, the index of the maximum value, the sum of the non-coherent integration results, sum of the squares of the non-coherent integration results, etc. These statistical values can be used in the acquisition phase to determine the correct Doppler frequency and code phase of the incoming signal, and in the tracking phase to fine-tune the phases of the oscillators.

Figure 4:
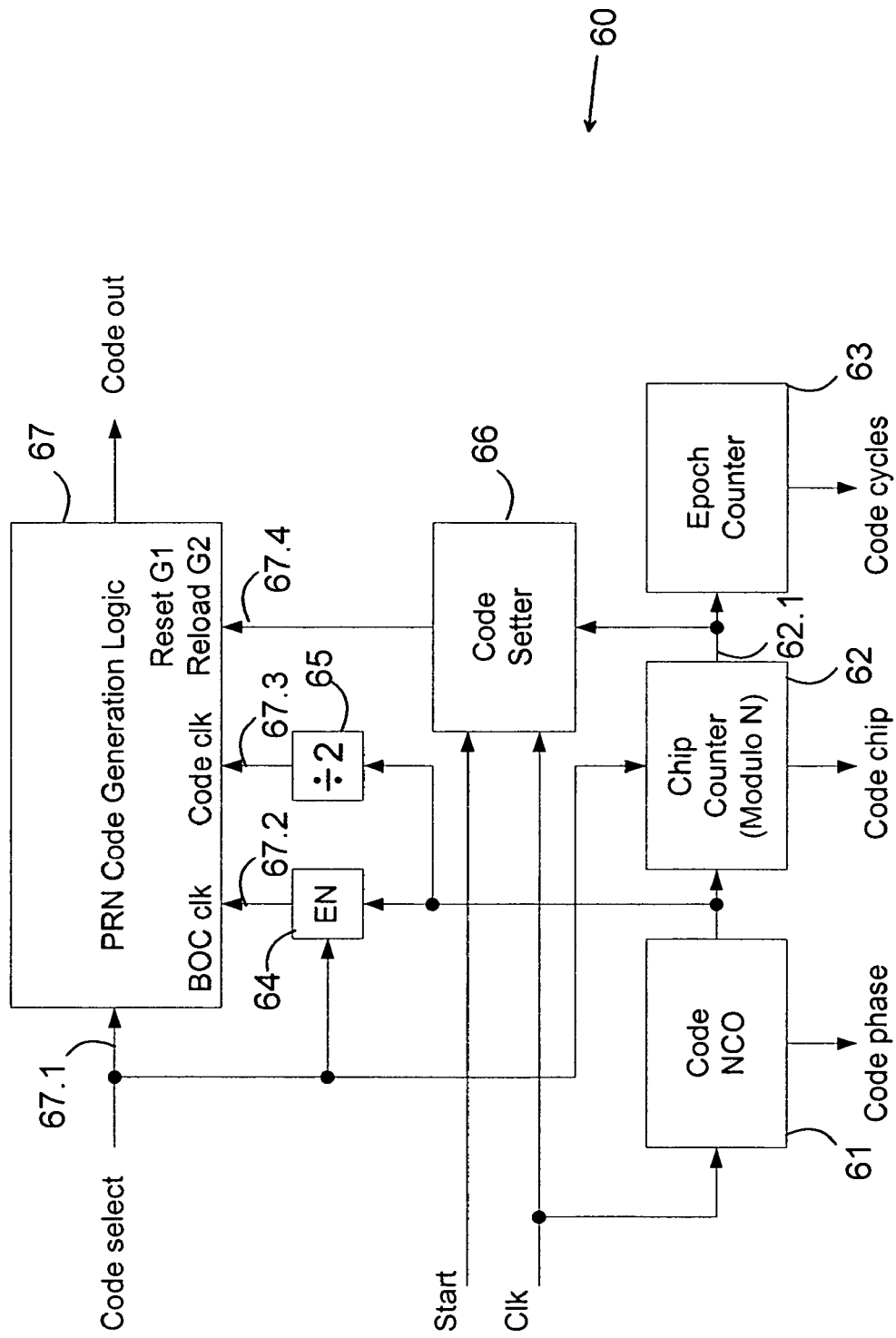
FIG. 4 shows an example embodiment of the code generator block.

The code generator block 60 generates the necessary reference codes corresponding to the modulation codes of the signals to be acquired and tracked by the group correlator core block 30. An example embodiment of the code generator block 60 is depicted in FIG. 4. The code generator block 60 comprises a numerically controlled oscillator 61 to generate frequency which is an integer multiple of the code frequency, in this example substantially twice the code frequency, for example 2 MHz. The signal from the numerically controlled oscillator 61 is coupled to a chip counter 62, which counts the pulses at the output of the numerically controlled oscillator 61. The pulses are shorter than the chip length when the frequency of the numerically controlled oscillator 61 is greater than the code frequency. For example, if the frequency of the numerically controlled oscillator 61 is twice the code frequency, the chip counter 62 counts halves of the chips i.e. two pulses for each chip. Therefore, the chip counter 62 divides the frequency of the numerically controlled oscillator 61 by the number N. In this particular example the value of N is twice the number of chips in one epoch. The output of the chip counter 62 is the frequency of the epochs. The output 62.1 of the chip counter 62 is connected to the epoch counter 63 and to the code setter 66. The epoch counter 63 counts the epochs. The information on the number of epochs is also used to reset the code generated by the code generator logic 67 at a correct phase. The signal which is connected from the output of the chip counter 62 to the code setter 66 is normally transferred directly to the reset/reload input 67.4 of the code generator logic 67. It is also possible to use the code setter 66 to generate a reset/reload pulse to the reset/reload input of the code generator logic 67. When the code setter 66 is used to generate the reset/reload pulse the numerically controlled oscillator 61, the chip counter 62 and the epoch counter 63 are initialised substantially at the same moment. The numerically controlled oscillator 61 is initialised to the starting phase of the code and the values of the counters 62, 63 are set to 0.

The signal from the numerically controlled oscillator 61 is also coupled to a gate 64 and a divider 65. The gate 64 is enabled/disabled by a code select signal to pass the signal from the numerically controlled oscillator 61 to the BOC clock input 67.2 of the reference code generation block 67 as a BOC clock signal (=2× reference code rate in this example). In this example embodiment the divider 65 divides the signal generated by the numerically controlled oscillator 61 by two to be used as an input signal to a code clock input 67.3 of the reference code generation block 67. The code setter 66 also has the ability to set fractional code phase by programming the start value of the numerically controlled oscillator 61. The code generator operates in a time multiplexed manner to generate several codes in a single block.

Timing for the operations of the correlator 20 and other parts of the receiver 1 can be formed from a basic oscillator 1.10 (FIG. 1) by using dividers, numerically controlled oscillators (NCO) etc. The minimum required frequency of the basic oscillator 1.10 is calculated as a product of channels to be acquired/tracked by one group correlator core block 30 and the maximum sampling frequency of the incoming signal. In the tracking mode of signals of GPS/Galileo systems the data sampling frequency is e.g. 8.184 MHz, whereas in acquisition mode the data sampling frequency is e.g. 2.046 MHz (GPS), which means 2 samples/chip, or 4.092 MHz (Galileo), which means 4 samples/chip. Therefore, if one group correlator core block 30 has four channels to acquire/track, the minimum frequency for the basic oscillator is 32.736 MHz.

When the receiver 1 according to the invention is applied, for example, in satellite positioning systems, only one intermediate frequency removal block 1.2 is needed before the group correlator core block(s) 30, because the band-width after the group correlator core block(s) 30 covers the whole Doppler frequency range searched for satellite signals (frequency shift caused by Doppler shift). Moreover, a single sample register group 35 will be sufficient, because the contents of all the code shift registers 33 can be multiplied with the content of this sample register group 35.

It is also possible to connect the data samples in a parallel manner to the sample shift registers 35.1, . . . 35.m of the sample shift register group 35 as is indicated by the arrow 203 in FIG. 5.

Figure 6A:
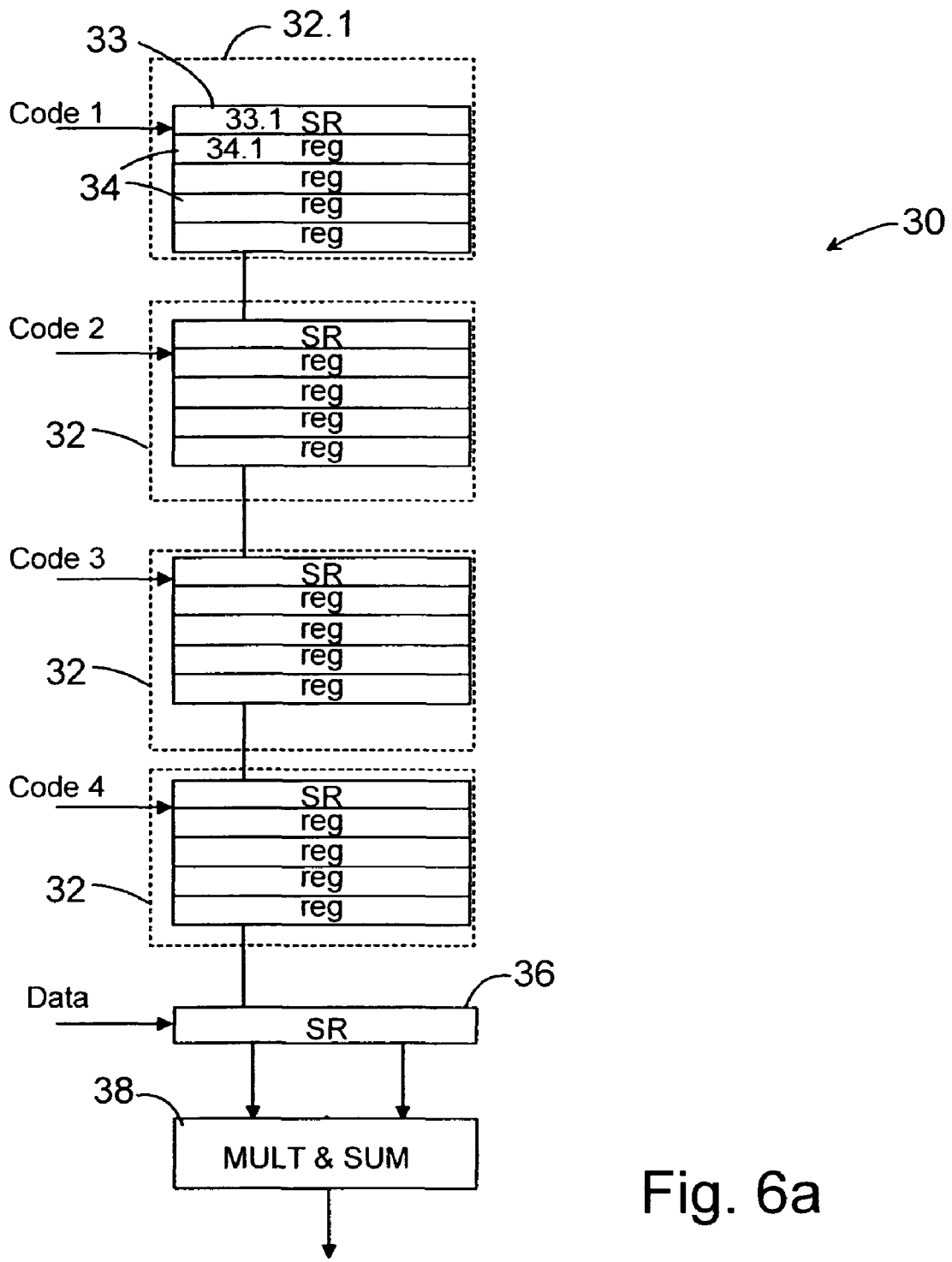
FIG. 6a shows a first example configuration of the group correlator core block according to the present invention operating in a basic frequency mode.
Figure 6B:
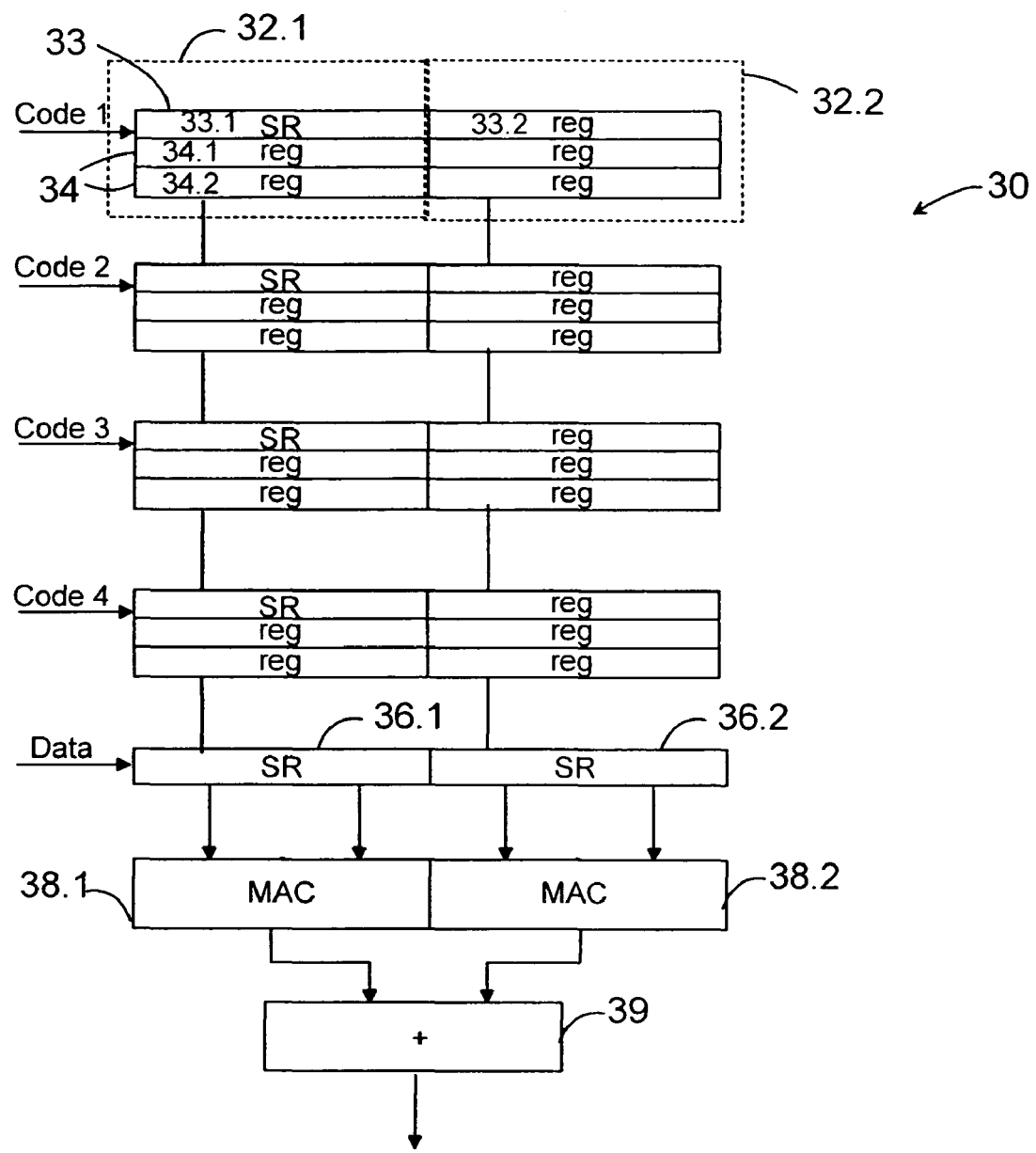
FIG. 6b shows a second example configuration of the group correlator code block according to the present invention operating in a double frequency mode.
Figure 6C:
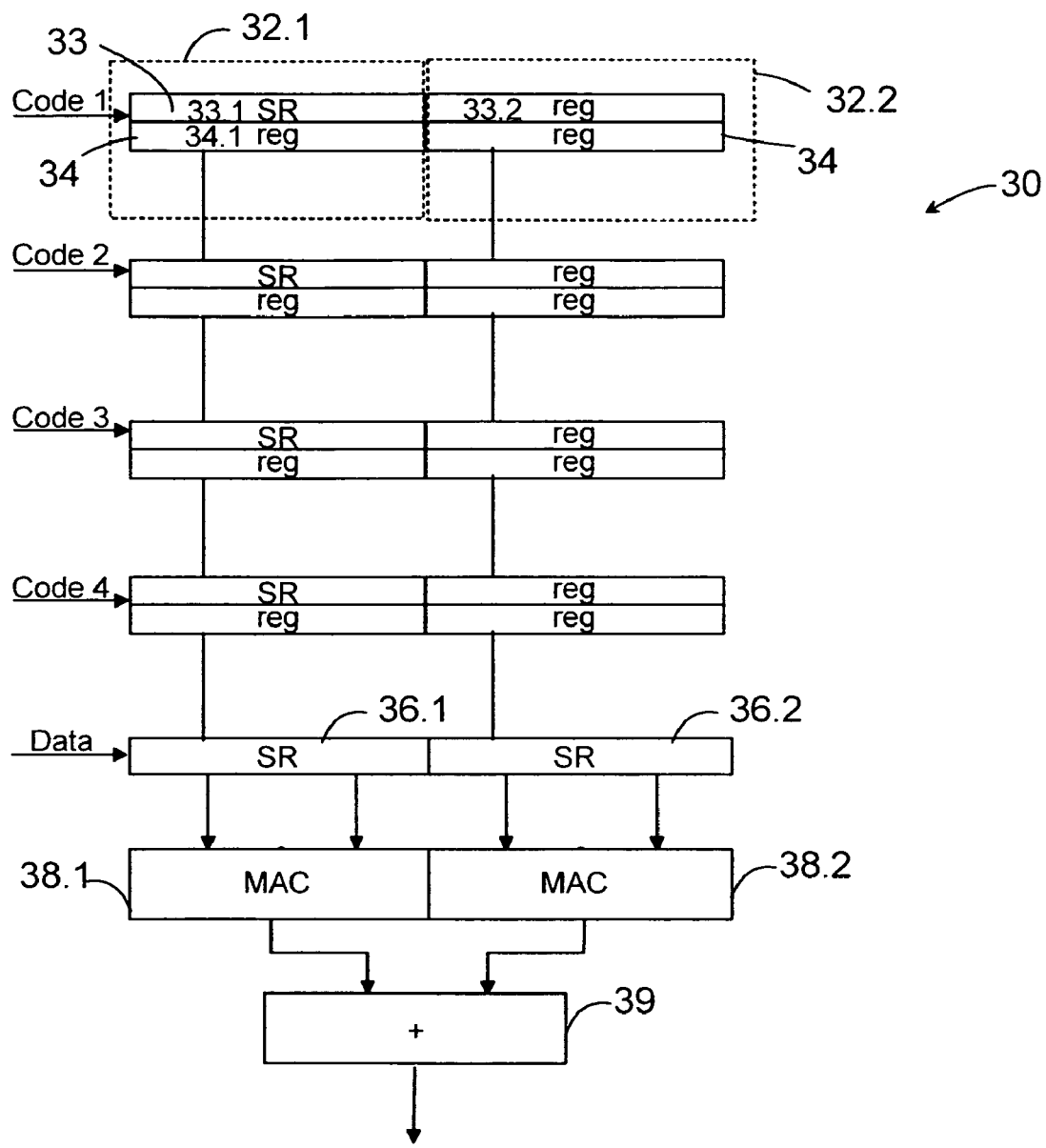
FIG. 6c shows a third example configuration of the group correlator code block according to the present invention operating in a quadruple frequency mode.

FIGS. 6a through 6c show the three different operational modes that the configurable group correlator according to FIG. 5 can be configured to. It should be noted here that in the embodiments of FIGS. 6a to 6c it is assumed that four channels are received, that there are only two subgroups 32 and that each subgroup comprises four code registers 34. However, the invention is not limited to such a group correlator and in practical implementations the number of subgroups and the number of registers within each subgroup may be much bigger than presented in these examples.

Basic Frequency Operation

Now, the control of the data flows of the group correlator core block 30 in the first operation mode will be described in more detail with reference to FIG. 6a. In the first operation mode (basic frequency operation mode) the data sampling frequency is selected to be the smallest sampling frequency of all the selectable sampling frequencies in this example embodiment. The smallest data sampling frequency is also denoted as B_CLK in the following descriptions of different modes of operation.

Figure 7:
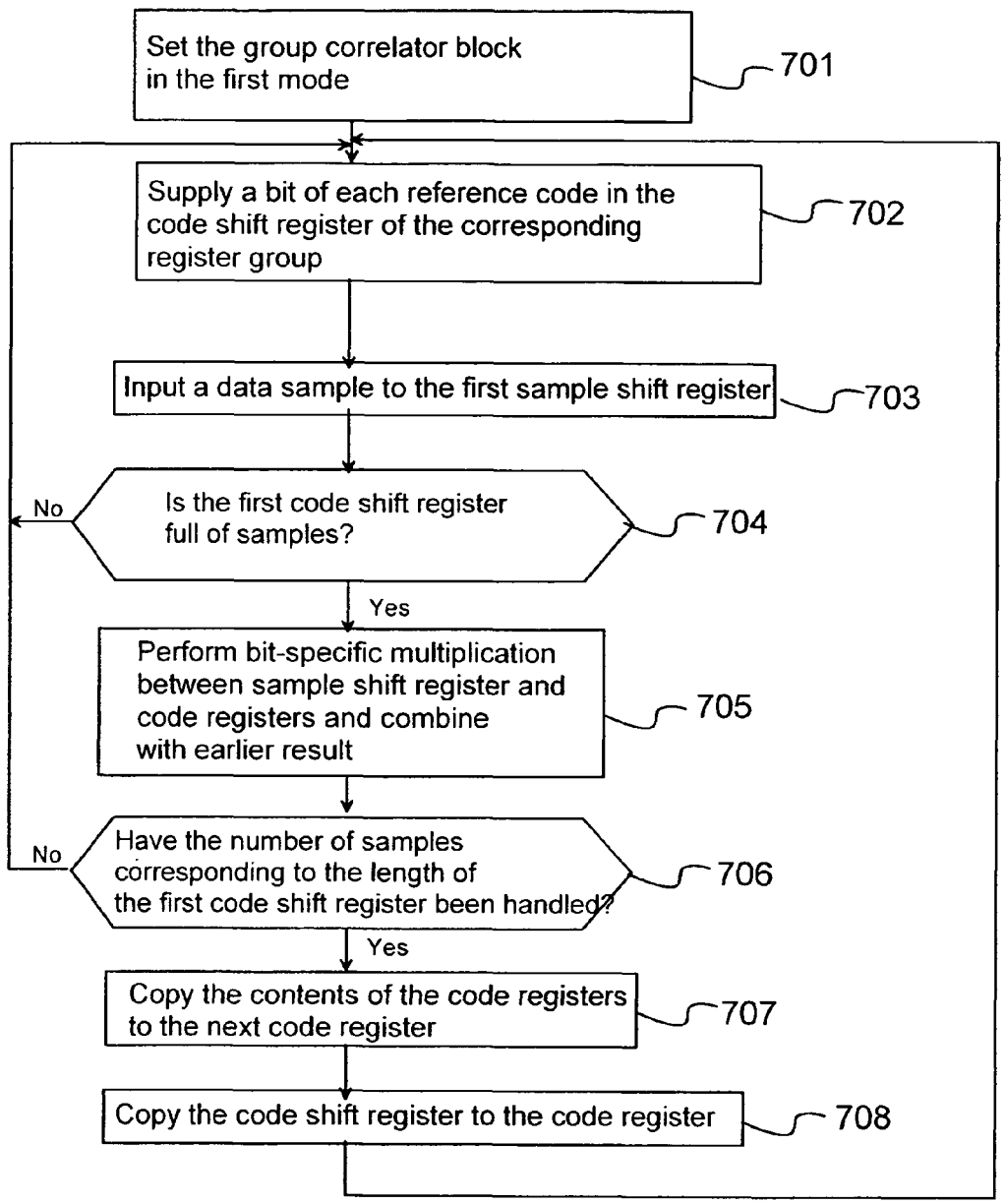
FIG. 7 shows an example of a method for correlating the spread spectrum signals according to the present invention.

The group correlator core block 30 is set to operate in a narrow mode (block 701 in FIG. 7), which means that only the first code shift register 33.1 within each subgroup 32 is in use.

Hence, the first code shift register 33.1 of each register group 31 is connected as an input for a reference code.

In each subgroup 32 the inputs of the first code register 34.1.1, 34.2.1, . . . , 34.m.1 are connected to the outputs of the first code shift register 33.1, 33.2, 33.m so that data stored in the first code shift register 33.1, 33.2, 33.m can be copied to the first code register 34.1.1 of the same subgroup 32 when necessary. Respectively, the inputs of the second code register 34.1.2, 34.2.2, . . . , 34.m.2 are connected to the outputs of the first code register 34.1.1, 34.2.1, . . . , 34.m.1. If there are more than two code registers 34 in the subgroups 32, all of them are successively connected to the previous code register 34 within the subgroup 32. In other words, the code registers 34 of the subgroups 32 can store a longer part of the reference code than the length of the first code register 34.1.1.

It is also possible to lengthen the storage capability of the reference code by connecting the last code register of one subgroup to the first code register of another subgroup of the same register group 31. This kind of chaining is indicated by the arrows 201 in FIG. 5. The chaining is used in the narrow mode which makes it possible to use the same code registers either as short code registers (e,g, four code registers each of which is 32 bit long) or long code registers (e.g. two code registers each of which is 64 bits long). A further option to lengthen the storage capability of the reference code is possible by connecting the last code register of the last subgroup of one register group 31 to the first code register of the first subgroup of another register group 31. This kind of chaining is indicated by the arrows 202 in FIG. 2. However, this latter option reduces the number of independent channels the group correlator core block 30 can simultaneously process, even if it does not reduce the total number of code bins that can be processed.

In operation the first code shift register 33.1 is supplied with bits of the reference code corresponding to the code used in the modulation of one signal to be received (block 702), at the same rate as samples are input in the sample shift register 35.1, . . . 35.m (block 703); that is, one bit of the reference code is input per each sample. Thus, the length of the first code shift register 33.1 and the code registers 34 equals to the length of the sample shift register 35.1, . . . 35.m. In this example of the first operation mode the data sampling frequency is 1×B_CLK, i.e. twice the chipping rate. Hence, two samples are taken of each chip. In block 704 it is checked whether the code register 34 is full of samples. If the code register 34 is full of samples the multiplication operation is performed (block 705). Otherwise the operations of the blocks 702 and 703 are repeated to input the next sample and the next bit of each reference code.

The multiplication operation is performed in the multiply and combine block 37.1, . . . 37.m which performs a bit-specific multiplication in a multiplexed manner with the samples of the sample shift register 35.1, . . . 35.m and the bits of each code register 34 (block 705). In block 706 the number of code bits stored in the first code shift register 33.1 is checked. After a given number of code bits have been stored in the first code shift register 33.1, the code bits in the last minus one code register are copied to the last code register, the code bits in the last minus two code register are copied to the last minus one code register, . . . , the code bits in the first code register 34.1.1 are copied to the second code register 34.2.1 (block 707), and the code bits in the first code shift register 33.1 are copied to the first code register 34 (block 708). The storage in the first code register 34 is performed after the storage of the number of samples corresponding to the length of the first code shift register 33.1. If the length of the first code shift register 33.1 is denoted with GC (GC storage locations), the data of the first code shift register 33.1 is copied in the code register 34 after every GC samples. The length of the code shift register 33.1 is not necessarily equal to the length of the reference code, but coherent integration can be applied to the output of the group correlator block 30 by extending the integration over the whole epoch.

After each input sample the multiply and combine block 37.1, . . . 37.m performs a bit-specific multiplication in a multiplexed manner with the samples of the sample shift register 35.1, . . . 35.m and the bits of each code register 34 (block 705). In this context, multiplexing means that the samples of the sample shift register 35.1, . . . 35.m and one code register 34 are multiplied at one time and the multiplication results (correlation part results) are combined in the multiply and combine block 37.1, . . . 37.m. These multiplications and combinations are repeated until all or a sufficient number of code registers have been scanned through. The result is N correlation results. Consequently, the multiplication between each code register 34 and the sample shift register 35.1, . . . 35.m can be performed for the same sample string by using only one multiplier and only one combiner. After this, the multiplication is always performed after a new sample has been input in the sample shift register 35.1, . . . 35.m. Consequently, this is a series of multiplications, in which the value of the code register 34 is the same for GC samples, but the sample shift register 35.1, . . . 35.m is shifted by one after every multiplication and a new sample is input in the first register. In this way, the correlation can be made between the samples and the codes (code register×sample shift register). Thus, in the receiver according to the invention, the content of the code register 34 is not changed after every sample but after every GC samples.

The block 704 is not necessarily needed but the operation of the correlator 1.3 can also be implemented in such a way that the group correlator core block 30 calculates the output values even before the first code register 33.1 is full of samples but the other blocks after the group correlator core block 30 are aware of if the first code register 33.1 is not yet full of samples and does not begin their operation, i.e. the other blocks after the group correlator core block 30 blocks do not use the output values of the group correlator core block before the first code register 33.1 is full of samples.

The output of the group correlator core block 30 comprises N×MF samples, in which the term MF is the multiplication factor. Each sample which corresponds to the integration of GC samples by one correlator. In other words, for each sample a correlation result is output from each code register. In the system of FIG. 6a this means that 32 correlation results are output for each input sample. The output signal of the group correlator core block 30 thus corresponds to the output signals of correlators (GC correlators) in a receiver of prior art. However, one difference is, for example, that each sample of the group correlator core block 30 according to the invention corresponds to the integration of GC samples.

The above described steps are performed for each receiving channel, that is, for each signal to be simultaneously received. In the mixers of the mixer group 40, the signals formed in the group correlator block 30 are mixed with the signal of the frequency bin generator block 41 to perform a multiplication operation between these signals. From the mixer group 40, the signals are input in a coherent integration block 51. In the coherent integration block 51, the signal components I and Q are integrated as described above, for example, on the length of the whole epoch, for example for acquisition and tracking.

Double Frequency Operation

Now, the control of the data flows of the group correlator core block 30 in the second operation mode will be described in more detail with reference to FIG. 6b. In the second operation mode (double frequency operation mode, 2×B_CLK) the group correlator core block 30 is set to operate in a wide mode. This means that two or more of the code shift registers 33 within each subgroup 32 operate successively. Hence, the first code shift register 33.1 of each register group 31 is connected as an input for a reference code and the last storage position of the first code shift register 33.1 provides input for the first storage position of the next code shift register 33.2, i.e. the second code shift register. Respectively, the last storage position of the second code shift register 33.2 provides input for the first storage position of the next code shift register, and finally the last storage position of the (M−1)th code shift register 33.2 provides input for the first storage position of the Mth code shift register 33.1. However, in the example of FIG. 6b the value of M is 2. Hence, only two subgroups 32 are shown.

It is also possible to pair-wise connect the subgroups together. In that option, e.g. the code shift registers and the code registers of the first and the second subgroup are connected in parallel to double the length of the code shift register and code registers. Respectively, the code registers of the third and fourth subgroup (if they exist) can be connected in parallel, the code registers of the fifth and sixth subgroup (if they exist) can be connected in parallel, etc.

In each subgroup 32 the inputs of the first code register 34.1.1 are connected to the outputs of the code shift registers 33 so that data stored in the code shift register 33 can be copied to the first code register 34.1.1 of the same subgroup 32 when necessary. Respectively, the inputs of the second code register 34.2.1 are connected to the outputs of the first code register 34.1.1. If there are more than two code registers 34 in the subgroups 32, all of them are successively connected to the previous code register 34 within the subgroup 32. In other words, the code shift registers 33 and the code registers 34 of the subgroups 32 form a kind of a code register matrix in which the code shift registers 33 form the first row and the code registers 34 form the other rows of the matrix.

It is also possible to lengthen the storage capability of the reference code by connecting the last code register of one subgroup to the first code register of the same subgroup of the next register group 31. This kind of chaining is indicated by the arrows 204 in FIG. 5. However, this option reduces the number of independent channels the group correlator core block 30 can simultaneously process, even if it does not reduce the total number of code bins that can be processed.

In operation the first code shift register 33.1 is supplied with bits of the reference code corresponding to the code used in the modulation of one signal to be received, at the same rate as samples are input in the sample shift register 35.1, . . . 35.m; that is, one bit of the reference code is input per each sample. Thus, the length of the first code shift register 33.1 plus the length of the second code shift register 33.2 equals to the length of the first sample shift register 35.1 plus the length of the second sample shift register 35.2. Also the length of the code registers 34 equals to the length of the first code shift register 33.1 plus the length of the second sample code register 33.2.

In this example of the second operation mode the data sampling frequency is 2×B_CLK, i.e. four times the chipping rate. Hence, four samples are taken of each chip. Also the registers of the first subgroup and the second subgroup are operating in parallel, i.e. the first code shift register 33.1 and the second code shift register 33.2 are connected in parallel, the first code register of the first subgroup 32.1 and the first code register of the second subgroup 32.2 are connected in parallel, etc. After a given number of code bits (=the number of samples corresponding to the length of the first 33.1 and the second code shift register 33.2) have been stored in the first 33.1 and the second code shift register 33.2, the code bits in the first code shift register 33.1 are copied to the first code register 34.1.1 of the first subgroup 32.1 and the code bits in the second code shift register 33.2 are copied to the first code register 34.1.1 of the second subgroup 32.2. If the length of the first 33.1 and the second code shift register 33.2 is together denoted with 2GC (2×GC storage locations), the data of the first code shift register 33.1 is copied to the first code register 34 of the first subgroup 32.1 and, respectively, the data of the second code shift register 33.2 is copied to the first code register 34 of the second subgroup 32.2 after every 2GC samples. Also in the second operation mode, the length of the code shift register 33 is not necessarily equal to the length of the reference code, but coherent integration can be applied to the output of the group correlator block 30 by extending the integration over the whole epoch.

After the data of the first 33.1 and the second code shift registers 33.2 have been copied/transferred at least once into the code registers 34 (i.e., the first 33.1 and the second code shift registers 33.2 are full of samples), the multiplier 37.1 performs a bit-specific multiplication in a multiplexed manner with the samples of the first sample shift register 35.1 and the bits of the first code register 34.1.1 of the first subgroup 32.1, and a bit-specific multiplication in a multiplexed manner with the samples of the second sample shift register 35.2 and the bits of the first code register 34.1.1 of the second subgroup 32.2. The multiplication results (correlation part results) are combined in the multiply and combine blocks 37.1, 37.2. These multiplications and combinations are repeated until all or a sufficient number of code registers have been scanned through. The result is N correlation results. Consequently, the multiplication between each code register 34 and the sample shift register 35.1, . . . 35.m can be performed for the same sample string by using only one multiply and combine block 37. After this, the multiplication is always performed after a new sample has been input in the first sample shift register 35.1.

Consequently, this is a series of multiplications, in which the values of the code registers 34 are the same for 2GC samples, but the first 35.1 and second sample shift registers 35.2 are shifted by one after every multiplication and a new sample is input in the first code shift register 33.1.

The output of the group correlator core block 30 comprises N×MF/2 samples, each of which corresponds to the integration of 2GC samples by one correlator.

The output samples of the group correlator are computed at a rate of N×MF/2×2×MCLK=N×MF×MCLK, which is the same rate as in the first mode. Between each loading of new reference code values into the code registers 34, the group correlator produces correlation results for 2GC separate code phases for N×MF/2 reference codes, i.e. GC×N×MF individual code bins, which again is the same as in the first mode. The time between each loading of new reference code values into the code registers 34 is 2GC input samples at rate of 2×MCLK, which is the same as GC samples at rate of MCLK, i.e. the same as in the first mode. These timing equivalences make the implementation of the blocks that follow the group correlator much easier, as the data rate and the total number of code phases remains the same.

The above described steps are performed for each receiving channel, that is, for each signal to be received simultaneously. In the mixers of the mixer group 40, the signals formed in the group correlator block 30 are mixed with the signal of the frequency bin generator block 41 to perform a multiplication operation between these signals. From the mixer group 40, the signals are input in a coherent integration block 51. In the coherent integration block 51, the signal components I and Q are integrated as described above, for example, on the length of the whole epoch, for example for acquisition and tracking.

Quadruple Frequency Operation

Now, the control of the data flows of the group correlator core block 30 in the third operation mode will be described in more detail with reference to FIG. 6c. In the third operation mode (quadruple frequency operation mode, 4×B_CLK) the group correlator core block 30 is set to operate in a wide mode. This means that two or more of the code shift registers 33 within each subgroup 32 operate successively as in the second operation mode.

In each subgroup 32 the inputs of the first code register 34.1.1 are connected to the outputs of the code shift registers 33 so that data stored in the code shift register 33 can be copied to the first code register 34.1.1 of the same subgroup 32 when necessary. In this operation mode the outputs of the first code register 34.1.1 are not connected to the second code register but directly to the multiply and combine blocks 37.1, 37.2.

In operation the first code shift register 33.1 is supplied with bits of the reference code corresponding to the code used in the modulation of one signal to be received, at the same rate as samples are input in the sample shift register 35.1, . . . 35.m; that is, one bit of the reference code is input per each sample. Thus, the length of the first code shift register 33.1 plus the length of the second code shift register 33.2 equals to the length of the first sample shift register 35.1 plus the length of the second sample shift register 35.2. Also the length of the code registers 34 equals to the length of the first code shift register 34.1 plus the length of the second code shift register 34.2.

In this example of the third operation mode the data sampling frequency is 4×B_CLK, i.e. eight times the chipping rate. Hence, eight samples are taken of each chip. After a given number of code bits have been stored in the first 33.1 and the second code shift register 33.2, the code bits in the first code shift register 33.1 are copied to the first code register 34.1.1 of the first subgroup 32.1 and the code bits in the second code shift register 33.2 are copied to the first code register 34.1.1 of the second subgroup 32.2. The storage in the code registers 34 is performed after the storage of the number of samples corresponding to the length of the first 33.1 and second code shift register 33.2. Also in the third operation mode, the length of the code shift register 33 is not necessarily equal to the length of the reference code, but coherent integration can be applied to the output of the group correlator block 30 by extending the integration over the whole epoch.

After the data of the first 33.1 and the second code shift registers 33.2 have been copied/transferred at least once into the code registers 34 (the first 33.1 and the second code shift register 33.2 are full of samples), the multiply and combine blocks 37 perform a bit-specific multiplication in a multiplexed manner with the samples of the sample shift register 35.1, . . . 35.m and the bits of each code register 34. In this context, multiplexing means that the samples of the first 35.1 and the second sample shift register 35.2 and two code registers 34 are multiplied at one time in the multiplier of the multiply and combine block 37.1, . . . 37.m, and the multiplication results (correlation part results) are combined in a combiner of the multiply and combine block 37.1, . . . 37.m. These multiplications and combinations are repeated until all or a sufficient number of code registers have been scanned through. The result is N correlation results. Consequently, the multiplication between each code register 34 and the sample shift register 35.1 . . . 35.m can be performed for the same sample string by using only one multiplier and only one combiner. After this, the multiplication is always performed after a new sample has been input in the first sample shift register 35.1. Consequently, this is a series of multiplications, in which the value of the code register 34 is the same for 2GC samples, but the first 35.1 and the second sample shift register 35.2 are shifted by one after every multiplication and a new sample is input in the first sample shift register 35.1. In this way, the correlation can be made between the samples and the codes (code register×sample shift register).

The output of the group correlator core block 30 comprises N samples, each of which corresponds to the integration of 2GC samples by one correlator.

The output samples of the group correlator are computed at a rate of N×MF/4×4×MCLK=N×MF×MCLK, which is the same rate as in the first mode. Between each loading of new reference code values into the code registers 34, the group correlator produces correlation results for 2GC separate code phases for N×MF/4 reference codes, i.e. GC×N×MF/2 individual code bins, which is half of the number in the first mode. The time between each loading of new reference code values into the code registers 34 is 2GC input samples at a rate of 4×MCLK, which is the same as GC samples at rate of 2×MCLK, i.e. two times faster than in the first mode. The equivalence of the rate of output samples between all the modes is very important with regards to the implementation ease of the blocks that follow the group correlator. The differences in the number of code bins and the rate of the loading of the code registers is somewhat inconvenient, but illustrates how the group correlator can operate even in these conditions. It would have been possible to make the group correlator to provide equal timing also in the third mode by implementing four subgroups, but that would incur extra hardware and increased cost.

The above described steps are performed for each receiving channel, that is, for each signal to be received simultaneously. In the mixers of the mixer group 40, the signals formed in the group correlator block 30 are mixed with the signal of the frequency bin generator block 41 to perform a time-to-frequency conversion, for example a discrete Fourier transform. Thus, information in the time domain can be converted to information in the time-frequency domain, to be used, for example, in the tracking function. From the mixer group 40, the signals of the time-frequency domain are input in a coherent integration block 51. In the coherent integration block 51, the signal components I and Q are integrated as described above, for example, on the length of the whole epoch, for example for acquisition and tracking.

The group correlator core block 30 according to the present invention allows widely configurable structure for different purposes. Some of the configuration parameters are the number of code inputs (number of channels), the number of code registers 34, the length of the code shift registers 33, the number of parallel shift registers, and the number of group correlator core blocks 30. Also the frequency of the basic oscillator may be varied in some applications.

In Table 2 the number of required group correlator core blocks 30 is indicated as a function of different requirements. It is assumed that each group correlator core blocks 30 generates four independent reference codes for 4 channel receiving capability, there are four code registers 34 in each register group 31, and each code shift register 33 is 64 samples long.

TABLE 2

| Group correlator blocks | Samples covered | GPS range | Galileo range | Satellites tracked |
|---|---|---|---|---|
| 1 | 1024 | 0.50 | 0.06 | 4 |
| 2 | 2048 | 1.00 | 0.13 | 8 |
| 4 | 4096 | 2.00 | 0.25 | 16 |
| 6 | 6144 | 3.00 | 0.38 | 24 |
| 8 | 8192 | 4.00 | 0.50 | 32 |
| 10 | 10240 | 5.00 | 0.63 | 40 |
| 12 | 12288 | 6.01 | 0.75 | 48 |
| 14 | 14336 | 7.01 | 0.88 | 56 |
| 16 | 16384 | 8.01 | 1.00 | 64 |
| 18 | 18432 | 9.01 | 1.13 | 72 |

The GPS range column indicates the GPS code length the correlator can handle at a time, and the Galileo range column indicates the Galileo code length the correlator can handle in single search. It can be seen from Table 2 that when the number of the group correlator core blocks 30 is 1, the receiver 1 can search half of GPS code (GPS range value is 0.5; $1^{st}$ row of Table 2). When the number of the group correlator core blocks 30 is 2 or more, the receiver 1 can search full GPS codes (the GPS range value is greater than or equal to 1; the $2^{nd}$, $3^{rd}$ and $4^{th}$ lines of Table 2). When the number of the group correlator core blocks 30 is between 8 and 14 (inclusive), the receiver 1 can search either four GPS satellites (GPS range value is 4 or greater) or half of Galileo code (Galileo range value is between 0.5 and 1). When the number of the group correlator core blocks 30 is 16 or more, the receiver 1 can search full Galileo code (the Galileo range value is greater than or equal to 1), or eight or more GPS satellites (the GPS range value is greater than or equal to 8).

In Table 3 some practical examples of the configuration parameters are shown.

TABLE 3

| Operating mode | GPS acquisition ($1^{st}$ mode) | Galileo acquisition ($2^{nd}$ mode) | Tracking ($3^{rd}$ mode) | |
|---|---|---|---|---|
| Data sampling frequency | 2.046 | 4.092 | 8.184 | MHz |
| Group correlator length | 64 | 128 | 128 | samples |
| Multiplexing factor in one group correlator block | 16 | 8 | 4 | GC/sample |
| Channel correlation coverage | 256 | 256 | 128 | samples |
| Channel correlation coverage in time | 125.1 | 62.6 | 1.3 | us |
| Max number of correlators in one group correlator block | 1024 | 1024 | 512 | samples |
| Max correlation coverage in time in one group correlator block | 500.5 | 250.2 | 125.1 | us |

Furthermore, the invention can be implemented as a module which is attached to e.g. a receiver. One alternative of such a module structure is to implement the group correlator block(s) 20 as a separate module(s).

However, it is apparent that other kinds of module structures can also be implemented in connection with the present invention.

Figure 8:
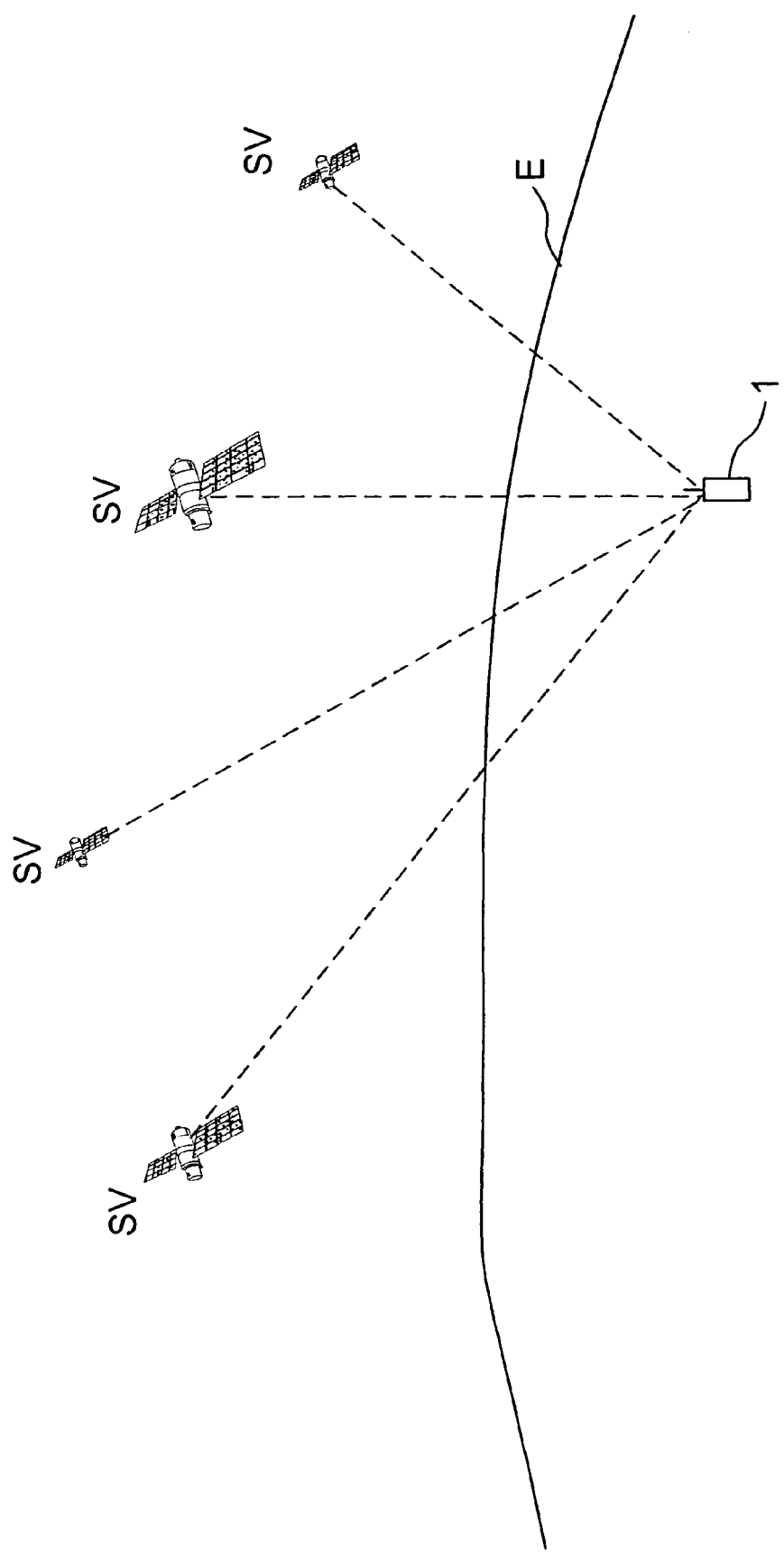
FIG. 8 shows an example of a GPS system in which the present invention can be applied.

FIG. 8 depicts a simplified model of a GNSS system. It comprises a number of satellites SV which transmit spread spectrum modulated signals. The satellites move on certain orbits around the earth E. The receiver 1 can receive the signals and perform the above described operations e.g. for determining the location of the receiver 1.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

Furthermore, it will be apparent that the present invention is not limited solely to the above-presented embodiments but it can be modified within the scope of the appended claims.

What is claimed is:

1. A correlator comprising:
   an input configured to input samples of a received spread spectrum signal;
   at least one reference code input configured to input at least one reference code;
   a correlator block comprising
      a data shift register configured to receive said signal samples;
   a number of register groups comprising
      a code shift register for receiving at least a part of at least one reference code; and
      a code register configured to receive data from the code shift register; and
      configuration pathways configured to arrange the connections between the code shift register and the code register of the register groups in a reconfigurable manner,
   wherein said number of register groups comprise at least two subgroups, each subgroup comprising:
      a code shift register; and
      at least two code registers,
   wherein said configuration pathways comprise
   signal connectors configured to arrange the code shift registers of said at least two subgroups to operate either in parallel or independently of each other; and
   signal connectors configured to arrange said at least two code registers of said subgroups to operate in parallel, in serial, or independently of each other.

2. The correlator according to claim 1 comprising at least a first register group and a second register group, and that said first register group is configured to perform correlation with a first spread spectrum signal, and said second register group is configured to perform correlation with a second spread spectrum signal.

3. The correlator according to claim 1 comprising at least a first register group and a second register group, and said first and second register group are connected in series to perform correlation with the same spread spectrum signal.

4. The correlator according to claim 1, configured to transfer the data of said code shift register and said sample shift register, configured to store a new sample in the sample shift register and configured to read new reference code data into the code shift register after the storing of the new sample, and that said code shift register, code register and sample shift register are equal in length.

5. The correlator according to claim 4, wherein the sample shift register and the code shift register have a determined length, wherein said correlator is configured to transfer the data of the code shift register into the code register after the formation of the number of samples corresponding to said length.

6. A receiver comprising:
a sampler configured to form samples of a received spread spectrum signal;
a correlator configured to perform a correlation with the samples of the received spread spectrum signal;
a code generator configured to generate at least one reference code for the correlator;
a mixer configured to mix correlated signals; and
an integrator configured to integrate the mixed signals;
wherein said correlator comprises:
  a data shift register configured to receive said signal samples;
  a number of register groups comprising
  a code shift register configured to receive at least a part of at least one reference code; and
  a code register configured to receive data from the code shift register;
wherein said correlator of the receiver also comprises:
  configuration pathways configured to arrange the connections between the code shift register and the code register of the register groups in a reconfigurable manner,
wherein said number of register groups comprise at least two subgroups, each subgroup comprising:
  a code shift register; and
  at least two code registers,
wherein said configuration pathways comprise
  signal connectors configured to arrange the code shift registers of said at least two subgroups to operate either in parallel or independently of each other; and
  signal connectors configured to arrange said at least two code registers of said subgroups to operate in parallel, in serial, or independently of each other.

7. The receiver according to claim 6, wherein the mixer comprises a frequency bin generator configured to generate a number of Doppler frequency bins.

8. The receiver according to claim 7, wherein the number of integrators equals the number of Doppler frequency bins generated by the frequency bin generator.

9. The receiver according to claim 6, wherein said code generator is configured to generate at least two different reference codes.

10. An electronic device comprising a receiver configured to receive a spread spectrum modulated signal, the receiver comprising:
a sampler configured to form samples of a received spread spectrum signal,
a correlator configured to perform a correlation with the samples of the received spread spectrum signal;
a code generator configured to generate at least one reference code for the correlator;
a mixer configured to mix correlated signals; and
an integrator configured to integrate the mixed signals;
wherein said correlator comprises:
a correlator block comprising:
  a data shift register configured to receive said signal samples;
a number of register groups comprising
  a code shift register configured to receive at least a part of at least one reference code; and
  a code register configured to receive data from the code shift register;
wherein said correlator of the electronic device also comprises:
  configuration pathways configured to arrange the connections between the code shift register and the code register of the register groups in a reconfigurable manner,
wherein said number of register groups comprise at least two subgroups, each subgroup comprising:
  a code shift register; and
  at least two code registers,
wherein said configuration pathways comprise
  signal connectors configured to arrange the code shift registers of said at least two subgroups to operate either in parallel or independently of each other; and
  signal connectors configured to arrange said at least two code registers of said subgroups to operate in parallel, in serial, or independently of each other.

11. A system comprising a transmitting station configured to transmit a spread spectrum modulated signal, a receiver configured to receive a spread spectrum modulated signal, the receiver comprising:
a sampler configured to form samples of a received spread spectrum signal;
a correlator configured to perform a correlation with the samples of the received spread spectrum signal;
a code generator configured to generate at least one reference code for the correlator;
a mixer configured to mix correlated signals; and
an integrator configured to integrate the mixed signals;
wherein said correlator comprises:
a correlator block comprising:
  a data shift register configured to receive said signal samples;
a number of register groups comprising
  a code shift register configured to receive at least a part of at least one reference code; and
  a code register configured to receive data from the code shift register;
wherein said correlator of the receiver comprises:
  configuration pathways configured to arrange the connections between the code shift register and the code register of the register groups in a reconfigurable manner,
wherein said number of register groups comprise at least two subgroups, each subgroup comprising:
  a code shift register; and
  at least two code registers,
wherein said configuration pathways comprise
  signal connectors configured to arrange the code shift registers of said at least two subgroups to operate either in parallel or independently of each other; and signal connectors configured to arrange said at least two code registers of said subgroups to operate in parallel, in serial, or independently of each other.

12. A module comprising:
an input configured to input samples of a received spread spectrum signal;
at least one reference code input configured to input at least one reference code;
a correlator comprising
a data shift register configured to receive said signal samples;
a number of register groups comprising
a code shift register configured to receive at least a part of at least one reference code; and
a code register configured to receive data from the code shift register;
wherein said correlator also comprises:
configuration pathways configured to arrange the connections between the code shift register and the code register of the register groups in a reconfigurable manner,
wherein said number of register groups comprise at least two subgroups, each subgroup comprising:
a code shift register; and
at least two code registers,
wherein said configuration pathways comprise
signal connectors configured to arrange the code shift registers of said at least two subgroups to operate either in parallel or independently of each other; and
signal connectors configured to arrange said at least two code registers of said subgroups to operate in parallel, in serial, or independently of each other.

13. A method for performing a correlation with a received spread spectrum signal in a correlator, the method comprising:
inputting samples of a received spread spectrum signal;
inputting at least one reference code;
receiving at least a part of at least one reference code to a code shift register of a number of register groups;
receiving data from the code shift register to a code register of said number of register groups; and
configuring pathways of said correlator configured to arrange the connections between the code shift register and the code register of the register groups,
wherein said number of register groups comprise two subgroups, each subgroup comprising a code shift register and at least two code registers, and wherein said configuration pathway arranges the code shift registers of said at least two subgroups to operate either in parallel or independently of each other; and
arranges said at least two code registers of said subgroups to operate in parallel, in serial, or independently of each other.

14. An apparatus comprising at least one processor and at least one readable medium including instructions, the at least one readable medium and instructions configured to, with the at least one processor, cause the apparatus at least to perform:
inputting samples of a received signal;
inputting at least one reference code;
receiving at least a part of at least one reference code to a code shift register;
receiving data from the code shift register to a code register of a number of register groups; and
configuring pathways of said apparatus so as to arrange connections between the code shift register and the code register of the register groups,
wherein said number of register groups comprise two subgroups, each subgroup comprising a code shift register and at least two code registers, and wherein said configuration pathway arranges the code shift registers of said at least two subgroups to operate either in parallel or independently of each other; and
arranges said at least two code registers of said subgroups to operate in parallel, in serial, or independently of each other.

15. A correlator comprising:
an input configured to input samples of a received signal;
at least one reference code input configured to input at least one reference code;
a data shift register configured to receive said signal samples;
a number of register groups comprising
a code shift register configured to receive at least a part of at least one reference code; and
a code register configured to receive data from the code shift register;
configuration pathways configured to arrange the connections between the code shift register and the code register of the register groups in a reconfigurable manner,
wherein said number of register groups comprise at least two subgroups, each subgroup comprising:
a code shift register; and
at least two code registers,
wherein said configuration pathways comprise
signal connectors configured to arrange the code shift registers of said at least two subgroups to operate either in parallel or independently of each other; and
signal connectors configured to arrange said at least two code registers of said subgroups to operate in parallel, in serial, or independently of each other.

16. A method comprising:
inputting samples of a received signal;
inputting at least one reference code;
receiving at least a part of at least one reference code to a code shift register;
receiving data from the code shift register to a code register of a number of register groups; and
configuring pathways of said correlator to arrange the connections between the code shift register and the code register of the register groups,
wherein said number of register groups comprise two subgroups, each subgroup comprising a code shift register and at least two code registers, and wherein said configuration pathway arranges the code shift registers of said at least two subgroups to operate either in parallel or independently of each other; and
arranges said at least two code registers of said subgroups to operate in parallel, in serial, or independently of each other.

* * * * *